(12) United States Patent
Shumarayev et al.

(10) Patent No.: US 7,109,744 B1
(45) Date of Patent: Sep. 19, 2006

(54) PROGRAMMABLE TERMINATION WITH DC VOLTAGE LEVEL CONTROL

(75) Inventors: Sergey Shumarayev, San Leandro, CA (US); Thomas White, Santa Clara, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 11/226,710

(22) Filed: Sep. 13, 2005

Related U.S. Application Data

(63) Continuation of application No. 10/946,902, filed on Sep. 21, 2004, now Pat. No. 6,980,022, which is a continuation of application No. 10/256,856, filed on Sep. 27, 2002, now Pat. No. 6,812,734.

(60) Provisional application No. 60/339,130, filed on Dec. 11, 2001.

(51) Int. Cl.
*H03K 19/0175* (2006.01)

(52) U.S. Cl. .............. 326/30; 326/86; 326/26; 326/27; 326/41; 327/108

(58) Field of Classification Search ........... 326/30, 326/86
See application file for complete search history.

(56) References Cited

U.S. PATENT DOCUMENTS

| | | | |
|---|---|---|---|
| 4,719,369 A | 1/1988 | Asano et al. | |
| 4,954,729 A | 9/1990 | Urai | |
| 5,111,081 A | 5/1992 | Atallah | |
| 5,134,311 A | 7/1992 | Biber et al. | |
| 5,151,611 A | 9/1992 | Rippey | |
| 5,164,663 A | 11/1992 | Alcorn | |
| 5,179,300 A | 1/1993 | Rolandi et al. | |
| 5,359,235 A | 10/1994 | Coyle et al. | |
| 5,374,861 A | 12/1994 | Kubista | |
| 5,592,510 A | 1/1997 | Van Brunt et al. | |
| 5,602,494 A | 2/1997 | Sundstrom | |
| 5,623,216 A | 4/1997 | Penza et al. | |
| 5,656,953 A | 8/1997 | Whetsel | |
| 5,721,548 A | 2/1998 | Choe et al. | |
| 5,726,582 A | 3/1998 | Hedberg | |
| 5,726,583 A | 3/1998 | Kaplinsky | |
| 5,764,080 A | 6/1998 | Huang et al. | |
| 5,864,715 A | 1/1999 | Zani et al. | |
| 5,939,896 A | 8/1999 | Hedberg | |
| 5,955,894 A | 9/1999 | Vishwanthaiah et al. | |
| 5,955,911 A | 9/1999 | Drost et al. | |
| 5,970,255 A | 10/1999 | Tran et al. | |
| 6,008,665 A | 12/1999 | Kalb et al. | |
| 6,020,760 A | 2/2000 | Sample et al. | |
| 6,026,456 A | 2/2000 | Ilkbahar | |
| 6,037,798 A | 3/2000 | Hedberg | |

(Continued)

OTHER PUBLICATIONS

"Apex 20K Programmable Logic Device Family ver. 3.7." product data sheet Altera Corporation, San Jose, CA (May 2001).

(Continued)

*Primary Examiner*—Vibol Tan
(74) *Attorney, Agent, or Firm*—J. Matthew Zigmant; Townsend and Townsend and Crew LLP

(57) ABSTRACT

Various embodiments for implementing circuits and systems with highly flexible interface circuitry that is capable of realizing programmable on-chip termination and DC level control. A number of techniques use existing I/O resources to implement programmable on-chip termination and DC level control that enable an integrated circuit to meet a variety of different high speed single-ended and differential I/O standards.

53 Claims, 4 Drawing Sheets

U.S. PATENT DOCUMENTS

| | | | |
|---|---|---|---|
| 6,049,255 A | 4/2000 | Hagberg et al. |
| 6,064,224 A | 5/2000 | Esch, Jr. et al. |
| 6,087,847 A | 7/2000 | Mooney et al. |
| 6,097,208 A | 8/2000 | Okajima et al. |
| 6,100,713 A | 8/2000 | Kalb et al. |
| 6,118,310 A | 9/2000 | Esch |
| 6,147,520 A | 11/2000 | Kothandaraman et al. |
| 6,154,060 A | 11/2000 | Morriss |
| 6,157,206 A | 12/2000 | Taylor et al. |
| 6,181,157 B1 | 1/2001 | Fiedler |
| 6,236,231 B1 | 5/2001 | Nguyen |
| 6,252,419 B1 | 6/2001 | Sung et al. |
| 6,329,836 B1 | 12/2001 | Drost et al. |
| 6,356,106 B1 | 3/2002 | Greef et al. |
| 6,362,644 B1 | 3/2002 | Jeffrey et al. |
| 6,366,128 B1 * | 4/2002 | Ghia et al. ............. 326/83 |
| 6,411,126 B1 | 6/2002 | Tinsley et al. |
| 6,414,512 B1 | 7/2002 | Moyer |
| 6,424,169 B1 | 7/2002 | Partow et al. |
| 6,433,579 B1 | 8/2002 | Wang et al. |
| 6,445,245 B1 | 9/2002 | Schultz et al. |
| 6,448,813 B1 | 9/2002 | Garlepp et al. |
| 6,466,063 B1 | 10/2002 | Chen |
| 6,480,026 B1 | 11/2002 | Andrews et al. |
| 6,489,837 B1 | 12/2002 | Schultz et al. |
| 6,504,397 B1 | 1/2003 | Hart et al. |
| 6,586,964 B1 | 7/2003 | Kent et al. |
| 6,590,413 B1 | 7/2003 | Yang |
| 6,603,329 B1 | 8/2003 | Wang et al. |
| 6,605,958 B1 | 8/2003 | Bergman et al. |
| 6,639,397 B1 | 10/2003 | Roth et al. |
| 6,642,740 B1 | 11/2003 | Kim et al. |
| 6,642,741 B1 | 11/2003 | Metz et al. |
| 6,683,482 B1 | 1/2004 | Humphrey et al. |
| 6,700,823 B1 | 3/2004 | Rahman et al. |
| 6,710,618 B1 | 3/2004 | Murray |
| 6,747,475 B1 | 6/2004 | Yuffe et al. |
| 6,766,155 B1 | 7/2004 | Salcido et al. |
| 6,788,101 B1 | 9/2004 | Rahman |
| 6,825,698 B1 * | 11/2004 | Wang et al. ............. 327/108 |
| 2002/0010853 A1 | 1/2002 | Trimberger et al. |
| 2002/0060602 A1 | 5/2002 | Ghia et al. |
| 2002/0101278 A1 | 8/2002 | Schultz et al. |
| 2003/0062922 A1 | 4/2003 | Douglass et al. |
| 2004/0008054 A1 | 1/2004 | Lesea et al. |

OTHER PUBLICATIONS

"Apex II Programmable Logic Device Family ver. 1.1," product Data Sheet, Altera Corporation San Jose, CA (May 2001).

Bendak et al. "CMOS VLSI Implementation of Gigabyte/second computer network links," proceedings of the 1996 IEEE International Symposium on Circuits and Systems 2:269-272 (May 1996).

Boni et al. "LVDS I/O Interface for Gb/s-per-Pin Operation in 0.35-μm CMOS," IEEE Journal of Solid-State Circuits 36(4):706-711 (Apr. 2001).

Esch et al. "Theory and Design of CMOS HSTL I/O Pads," The Hewlett Packard Journal, pp. 46-52 (Aug. 1998).

"Spartan-3 1.2V PFGA Family: Functional Description, CA DS099-2 (v1.2)," product specifications Xilinx, Inc., San Jose (Jul. 11, 2003).

"Virtex-II 1.5V Field Programmable Gate Arrays, DSO3102 (v1.5)," product specifications Xilinx, Inc., Sand Jose, CA (Apr. 2, 2001).

"Virtex-II Platform FPGAs: Detailed Description, DS031-2 (v3.1)," product specification Xilinx, Inc., San Jose, CA (Oct. 14, 2003).

"Virtex-II Pro Platform FPGAs: Functional Description, DS083-2 (v2.9)," product specifications Xilinx, Inc., San Jose, CA, (Oct. 14, 2003).

* cited by examiner

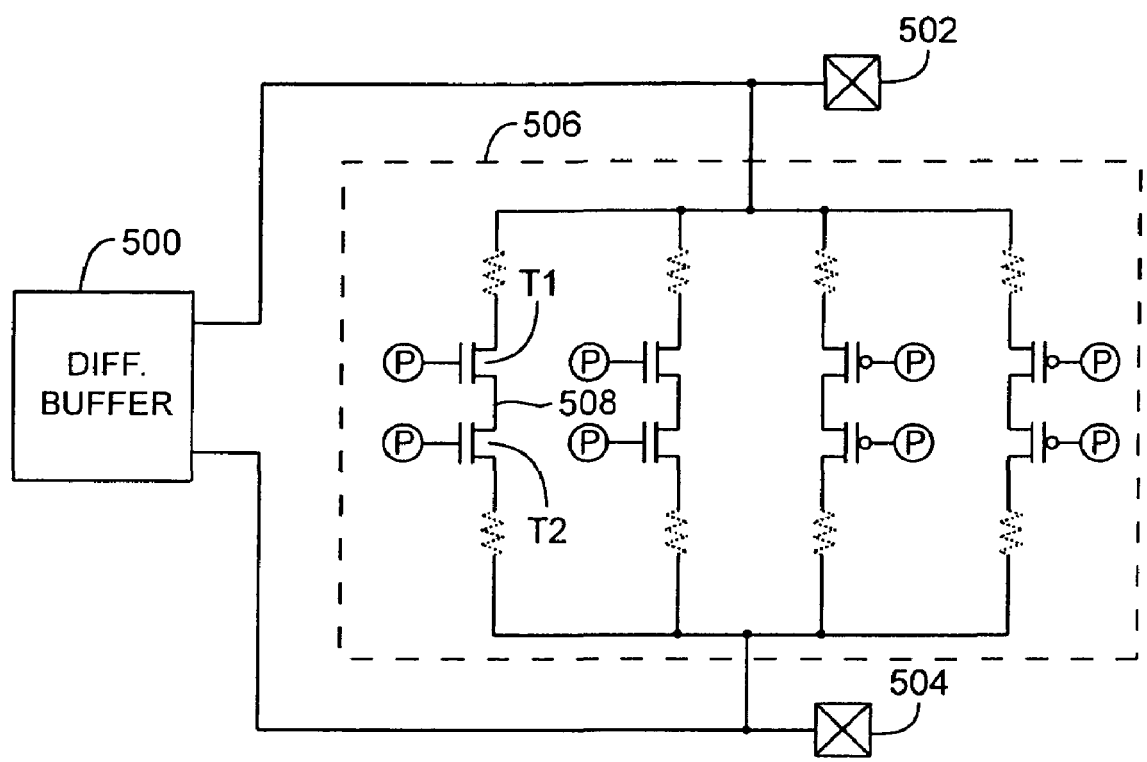
FIG. 5
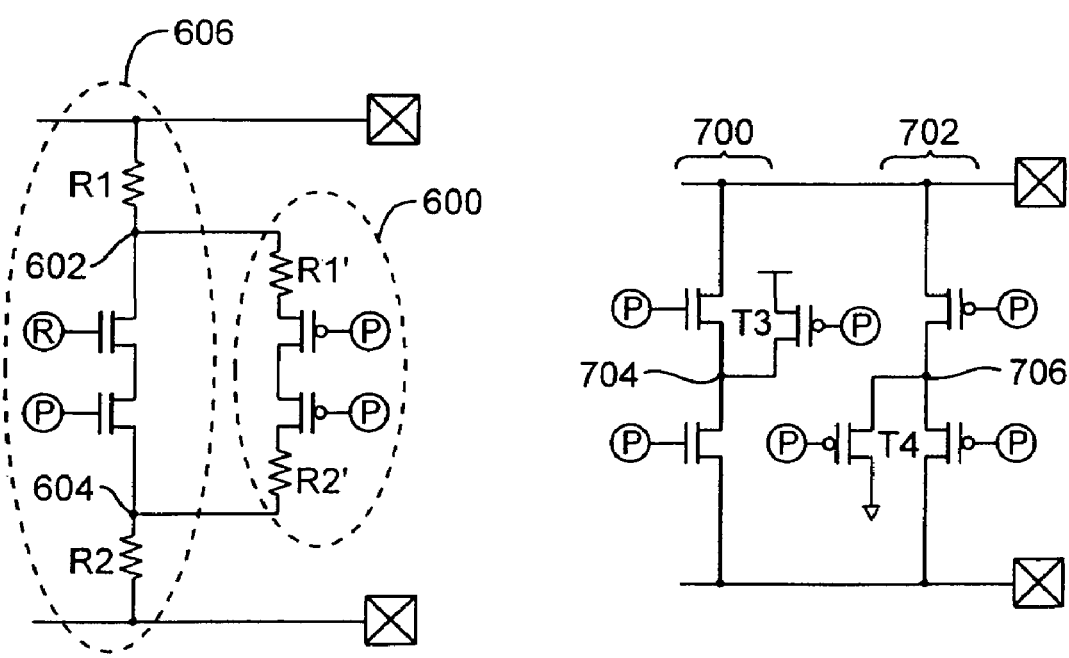
FIG. 6
FIG. 7

PROGRAMMABLE TERMINATION WITH DC VOLTAGE LEVEL CONTROL

CROSS-REFERENCES TO RELATED APPLICATIONS

This application is a continuation of U.S. patent application Ser. No. 10,946,902, filed Sep. 21, 2004, now U.S. Pat. No 6,980,022, which is a continuation of U.S. patent application Ser. No. 10/256,856, filed Sep. 27, 2002, now U.S. Pat. No. 6,812,734, which claims the benefit of Provisional Application No. 60/339,130, filed Dec. 11, 2001, both of which are incorporated by reference herein. This invention is related to commonly-assigned, co-pending patent application numbers 10/056,759, titled "Self-Tracking Circuit Technique for Integration of Differential Termination Resistance," by Yang, 10/044,459, titled "Methods for Implementing On-Chip Differential LVDS Termination," by Wang et al., 10/206,085, titled "Programmable On-Chip Termination Resistance," by Bui et al., and 10/206,250, titled "Programmable On-Chip Impedance Matching" by Bui et al., every one of which is hereby incorporated by reference herein in its entirety.

BACKGROUND OF THE INVENTION

The present invention relates in general to integrated circuitry and in particular to method and circuitry for implementing programmable on-chip termination resistance with DC voltage level control.

When transmitting signals over distances appreciable with respect to the signal period, mismatches between the impedance of the transmission line and that of the receiver cause signal reflection. The reflected signal interferes with the transmitted signal and causes distortion and degrades the overall signal integrity. To minimize or eliminate the unwanted reflection, transmission lines are resistively terminated by a matching impedance. Conventionally, the input and output pins on an integrated circuit package are terminated by coupling an external termination resistor of, e.g., 50 Ohm value to the relevant pins. For many of today's high speed integrated circuits, and particularly those that have large I/O pin counts, external termination poses a number of problems. At high frequencies, for example, the effects of package parasitics cannot be ignored making the reduction of external terminals (package pins or stubs) desirable. Interconnect paths on a circuit board as well as inside the package contribute to the parasitics increasing the delay in signal propagation. It is desirable therefore to implement the termination resistance on-chip to eliminated some of the parasitics. On-chip termination also reduces the number of external components.

Depending on the circuit application, there are a number of other factors that need to be considered when designing the termination structure. For example, over time, various data signaling techniques have developed to facilitate low voltage high speed signal transmission. Low voltage differential signaling (LVDS), current mode logic (CML), and low voltage pseudo emitter coupled logic (LVPECL) are examples of fully differential signaling techniques, while GTL, SSTL, HSTL are examples of pseudo differential signaling. The signal levels at the interface have not been standardized for every type of signaling technique. For example, LVPECL is a widely used signaling technique that has not been standardized resulting in many different vendor definitions for the signal levels at the interface. An on-chip termination resistance that is optimized for a signaling interface defined by one vendor may not provide optimum termination for another.

Another consideration is the output DC level in systems that use AC coupling at the I/O interface. AC coupling techniques that are typical of high speed communication channels require a biasing network at the receiver to provide a proper DC level for the received signal. For an on-chip differential termination resistance, proper DC biasing is needed.

It is therefore desirable to provide an on-chip termination structure that not only reduces external components and enhances data rate, but that is flexible enough to interface with varying signaling techniques as well as providing appropriate DC biasing when needed.

BRIEF SUMMARY OF THE INVENTION

The present invention provides various techniques for implementing circuits and systems having highly flexible I/O circuitry with programmable on-chip termination and DC level adjustment. In one embodiment, the invention utilizes a combination of resistors and transistors functioning as programmable resistors that couple across a differential pair of interface nodes to form programmable differential termination resistance. In another embodiment, the invention takes advantage of existing circuit resources at input and output terminals of an integrated circuit to implement near-end and far-end termination. In a specific embodiment, the present invention allows pull-up and pull-down transistors that are normally used to implement an output buffer or an input buffer to be programmed to implement near-end (in case of output buffers) and far-end (in case of input buffers) termination. In yet another specific embodiment, the invention uses pull-up and pull-down transistors of the input and output buffers to programmable shift the DC level and the operating voltage range of a differential driver.

Accordingly, in one embodiment, the present invention provides an integrated circuit including core logic configured to process data; and an interface circuit coupled between the core logic and a first external terminal, wherein the interface circuit includes a first pull-up path and a first pull-down path both coupled to the first external terminal, and programming circuitry coupled to the first pull-up path and the first pull-down path that is capable of programming the first pull-up path and the first pull-down path to process data in a first mode of operation, or to implement termination impedance in a second mode of operation.

In a specific embodiment, the interface circuit further includes a second pull-up path and a second pull-down path both coupled to a second external terminal; and a differential buffer coupled to the first external terminal and the second external terminal, wherein in the first mode of operation the differential buffer is disabled and the first and second pull-up and pull-down paths process data, and in the second mode of operation the differential buffer is enabled and the first and second pull-up and pull-down paths can be programmed to implement termination impedance. In a further specific embodiment according to the invention, in the second mode of operation, the first and second pull-up and pull-down paths can be programmed to shift a DC level of the first and second external terminals, respectively.

In another embodiment the present invention provides an integrated circuit including core logic configured to process data; and an interface circuit coupled between the core logic and an external terminal, wherein the interface circuit includes a first buffer having a pull-up transistor and a pull-down transistor both coupled to the first external terminal, and a second buffer coupled to the external terminal, and wherein when the first buffer is enabled the pull-up and pull-down transistors process data, and when the second buffer is enabled the pull-up and pull-down transistors can be programmably configured to implement termination impedance. In a specific embodiment, the first buffer includes an output buffer and the second buffer includes an input buffer.

In yet another embodiment, the present invention provides an integrated circuit including core logic configured to process data; and a differential interface circuit coupled between the core logic and first and second external terminals that carry data, wherein the differential interface circuit includes a differential buffer coupled to the first and second external terminals and a termination network coupled between the first and second external terminals. The termination network includes first and second transistors coupled in series between the first external terminal and the second external terminal, the first and second transistors having control terminals that couple to programmable control signals. In a specific embodiment the termination network further includes resistors coupled in series with the first and second transistors.

In a further embodiment the present invention provides an integrated circuit including a differential buffer coupled to a first external terminal and a second external terminal and configured to process data when enabled in a differential mode of operation; a first single-ended buffer coupled to the first external terminal and configured to process data when enabled in a single-ended mode of operation; a second single-ended buffer coupled to the second external terminal and configured to process data when enabled in the single-ended mode of operation; and control circuitry coupled to the first and second single-ended buffers and configured to programmably convert the first and the second single-ended buffers into termination impedance for the first and the second external terminals, respectively, when the integrated circuit operates in the differential mode.

The following detailed description and the accompanying drawings provide a better understanding of the nature and advantages of the programmable termination according to the present invention.

BRIEF DESCRIPTION OF THE DRAWINGS

FIG. 5 shows an example of on-chip programmable differential termination according to another embodiment of the present invention;

FIG. 6 shows an alternative implementation for the on-chip programmable differential termination of the present invention;

FIG. 7 shows yet another alternative implementation for the on-chip programmable differential termination of the present invention;

DETAILED DESCRIPTION OF THE INVENTION

For a variety of reasons it is desirable to provide an integrated (i.e., on chip) termination impedance for I/O terminals of an integrated circuit. To accommodate a growing number of differing I/O standards it is also desirable for the chip to have the capability to programmably configure the termination structure to provide for differing impedances, or single-ended versus differential termination, etc. In certain applications it may also be necessary to provide, preferably on-chip, a well-controlled DC level for the termination structure. One example of the type of integrated circuit that may require many of the above capabilities is the programmable logic device (PLD). As the gate count and speed of today's complex PLDs increase, they are finding fast growing new and varied fields of application. Highly flexible I/O circuitry including on-chip termination techniques have therefore become desirable features for today's complex PLDs. The present invention provides various embodiments for implementing on-chip near-end and far-end termination with programmable value adjustment that address the above needs, including termination matching, programmable common mode adjustment, package stub elimination, DC biasing in an AC coupled environment, among others. While some of the embodiments of the present invention are described herein in the context of a PLD, it is to be understood that the invention is not limited to PLDs and applies generally to different types of integrated circuits.

Figure 1:
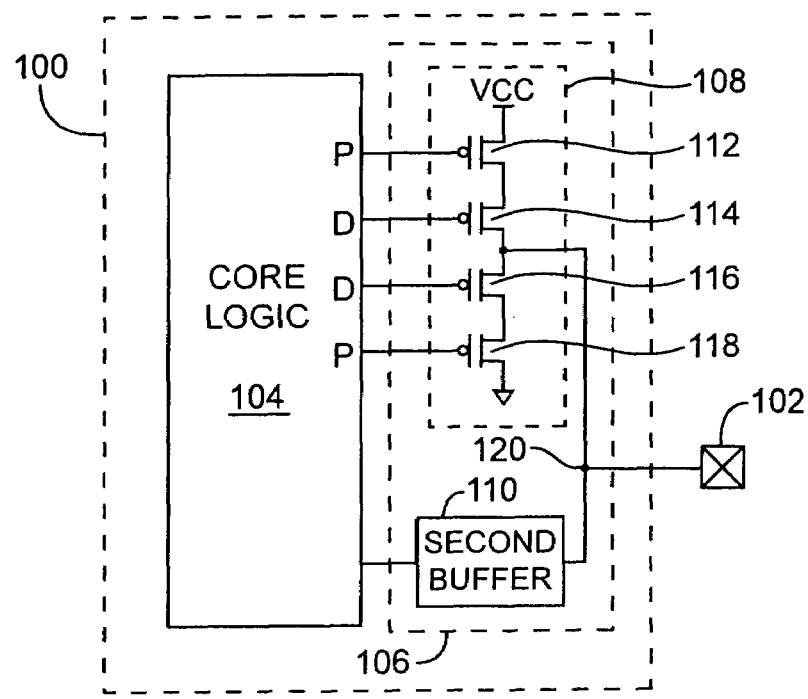
FIG. 1 is a block diagram of an integrated circuit with on-chip programmable termination according to one embodiment of the present invention.

FIG. 1 shows a block diagram of an integrated circuit 100 with on-chip programmable termination according to one embodiment of the present invention. Circuit 100 includes core logic 104 that connects to an external terminal 102 via I/O circuit 106. It is to be understood that the term I/O (input/output) as used herein refers generally to interface circuitry and may include an output driver, an input driver or both, or multiples of each. Further, while the diagram only shows a single external terminal, those skilled in this art will appreciate that circuit 100 may have multiple such terminals with accompanying I/O circuitry. Core logic 104 may comprise, for example, programmable logic resources that additionally may or may not include memory, microprocessor module, digital signal processing module or other circuitry. External terminal 104 is, for example, a pin or a stub on the package that houses integrated circuit 100. I/O circuit 106 includes, according to this embodiment, a first programmable output buffer 108 and a secondary buffer 110 both connected between core logic 104 and external terminal 102. In this embodiment, both buffers 108 and 110 process data. For example, buffer 108 is a programmable output driver while buffer 110 may be an input buffer to allow the same pin 102 to act as both an input pin and an output pin.

According to this embodiment of the present invention, when external terminal 102 operates as an input pin receiving data, instead of disabling output buffer 108, the transistors inside output buffer 108 are configured to implement on-chip parallel termination for pin 102. In the exemplary circuit implementation shown for output buffer 108, when processing data, transistors 114 and 116 are the driver transistors that receive data information at their gate terminals, while transistors 112 and 118 are the programmable transistor that receive programming information at their gate terminals. Accordingly, when pin 102 is an input pin and receives data that is then processed by second buffer 110, instead of turning off programmable transistors 112 and 118 to disable output buffer 108, the present invention programmably converts selected ones of the transistors into terminating impedances. For example, by turning off the series pull-down transistors 116 and 118 and turning on transistors 112 and 114 and biasing transistors 112 and 114 so that they operate in their linear region, the series on resistance of transistors 114 and 112 connecting I/O node 120 to the power supply Vcc would implement parallel termination for pin 102. In this manner, the present invention utilizes already existing resources of the circuit to provide parallel termination to comply with, for example, high-speed transceiver logic (HSTL) I/O standards. The resistance value of the termination impedance can also be programmably adjusted to a desired value. For example, certain PLDs, such as the Stratix PLD family manufactured by Altera Corporation, provide output buffers that are designed to have programmable output drive capability. Details of the I/O circuitry for the Altera Stratix PLD can be found in a data sheet available online at http://www.altera.com/literature/ds/ds_stx.pdf, which is hereby incorporated by reference in its entirety. For such circuits, core logic 104 is capable of programming output buffer 108 to provide varying drive capability and therefore varying output impedance. The present invention takes advantage of this capability to fine-tune the value of the resistance of the output transistors (e.g., 112 and 114) to match a desired termination value when buffer 108 is configured to implement termination impedance.

Figure 2:
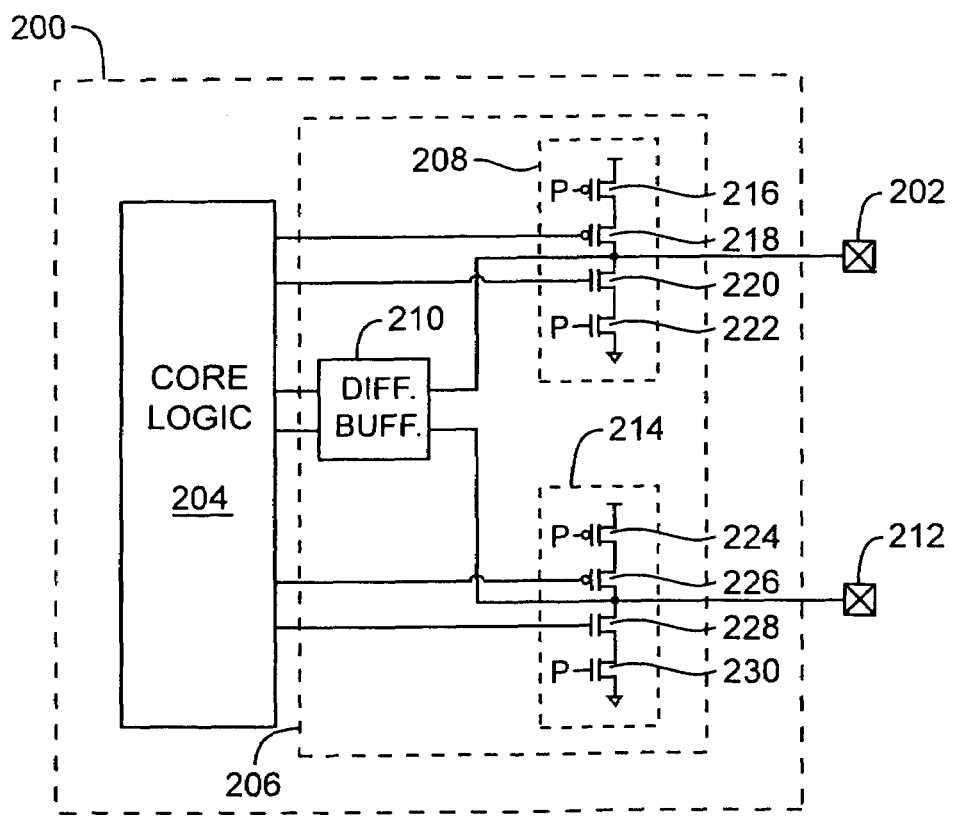
FIG. 2 shows an integrated circuit with on-chip programmable termination according to another embodiment of the present invention.

Secondary buffer 110 need not be an input buffer and may, in an alternative embodiment, be part of a differential buffer that connects to pin 102 as well as a second pin. Referring to FIG. 2, there is shown another exemplary integrated circuit 200 which is capable of implementing programmable on-chip termination according to another embodiment of the present invention. Integrated circuit 200 includes core logic 204 that connects to two external terminals 202 and 212 via I/O circuit 206. I/O circuit 206 includes output buffers 208 and 214 driving terminals 202 and 212, respectively, and a differential buffer 210 that connects to both terminals 202 and 212. Output buffers 208 and 214 are similarly structured as output buffer 108 in circuit 100 (FIG. 1), each having a pair of serially-connected pull-up transistors and a pair of serially-connected pull-down transistors. Differential buffer 210 may be either an input differential buffer or an output differential buffer. Circuit 200 can be configured to allow terminals 202 and 212 to either function as separate single-ended I/O terminals or paired as differential terminals.

According to this embodiment of the invention, circuit 200 can be configured to operate I/O circuit 206 in various modes including a single-ended mode and a differential mode. When I/O circuit 206 is configured to operate in the differential mode, differential buffer 210 is enabled and single-ended output buffers 208 and 214 are therefore not needed for processing data. Instead of disconnecting the output driver transistors from external terminals 202 and 212, the present invention provides the capability to program the buffers so that the output transistors act as resistive elements. This allows the circuit to, for example, programmably adjust the DC level of the signal on the nodes connecting to external terminals 202 and 212. Such DC level control is required in different I/O circuit applications and are typically implemented with components external to the chip. For example, high speed data transmission channels often use AC coupling at the receiver end which necessitates providing the appropriate DC bias at the receiver inputs. Therefore, when I/O circuit 206 is configured as a differential input buffer with differential buffer 210 enabled, for certain applications external terminals 202 and 212 require DC biasing. The present invention provides the capability to reconfigure the otherwise unused single-ended output buffers 208 and 214 to provide programmable DC level shifting for terminals 202 and 212. That is, by programmably enabling and adjusting the current drive of any combination of the pull-down and pull-up transistors in output buffers 208 and 214, the DC voltage level at these nodes can be moved up or down to a desired value. Configured as such, the output buffers essentially function as a voltage divider. This technique can also be used to accommodate I/O signaling schemes that may require varying common mode ranges for the received signal (due to lack of standardization).

Figure 3:
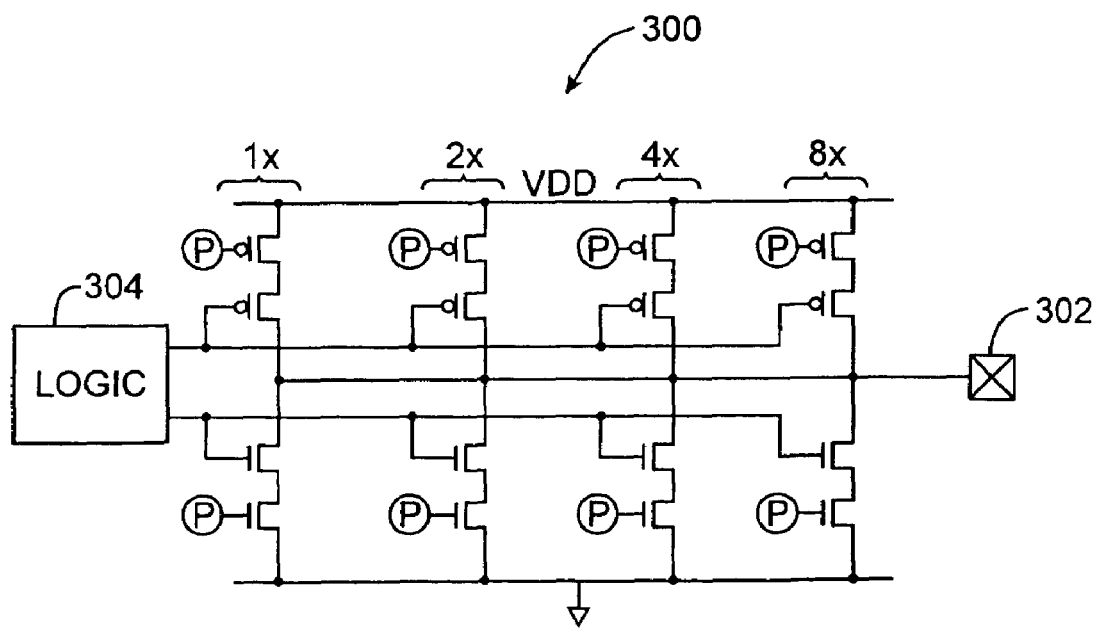
FIG. 3 is a highly simplified block diagram showing an example of I/O resources connected to external terminals according to an embodiment of the present invention.

In one embodiment, the present invention allows the current strengths and therefore the effective pull-up or pull-down resistance of the single-ended buffers to be programmed independently of the operation of differential buffer 210. FIG. 3 shows one exemplary implementation for an output buffer 300 with programmable current drive. Buffer 300 includes multiple (in this example four) parallel-connected I/O transistors connected to output node 302. When functioning as an output driver, at least one leg of the circuit is enabled by turning on the programmable series transistors (with their gate terminals connected to a programmable node P) in that leg. Logic block 304 drives the gate terminals of the other two driver transistors. To drive node 302 to logic high, the pull-up transistors in one or more of the driver legs are turned on with the corresponding pull-down path disconnected by turning off the series pull-down driver transistor. To drive node 302 to logic low, the pull-down transistors in one or more of the driver legs are turned on with the corresponding pull-up path disconnected by turning off the series pull-up driver transistor. Even when enabled, output buffer 300 can be tri-stated by turning both driver transistors in the enabled driver leg off. To adjust the current drive of the buffer, additional driver legs may be similarly turned on and off. The current drive strength of each leg may also be different by scaling the transistor sizes. For example, the transistor sizes in the four stages can be binary weighted in 1X, 2X, 4X and 8X ratios.

The preceding paragraph describes three logic states for output node 302, namely logic high, logic low and a tri-state condition. A fourth logic combination turns on both the pull-up path and the pull-down path of one or more of the driver legs. This condition, which provides a constant current path from the power supply to ground as in a voltage divider, is forbidden during normal operation of the output buffer. However, when output buffer 300 is not needed to drive data onto terminal 302, the voltage divider configuration allows the circuit to programmably adjust the DC level of the signal on node 302. Any combination of the pull-up and pull-down paths of the various driver legs can be programmably turned off or on to achieve the desired DC level at node 302. It is to be understood that the specific implementation shown in FIG. 3 is provided for illustrative purposes only, and that variations are possible. For example, output buffer 300 may have fewer than or more than four programmable driver legs. Also, the current drive capability of the driver legs may be weighted differently than shown.

Figure 4:
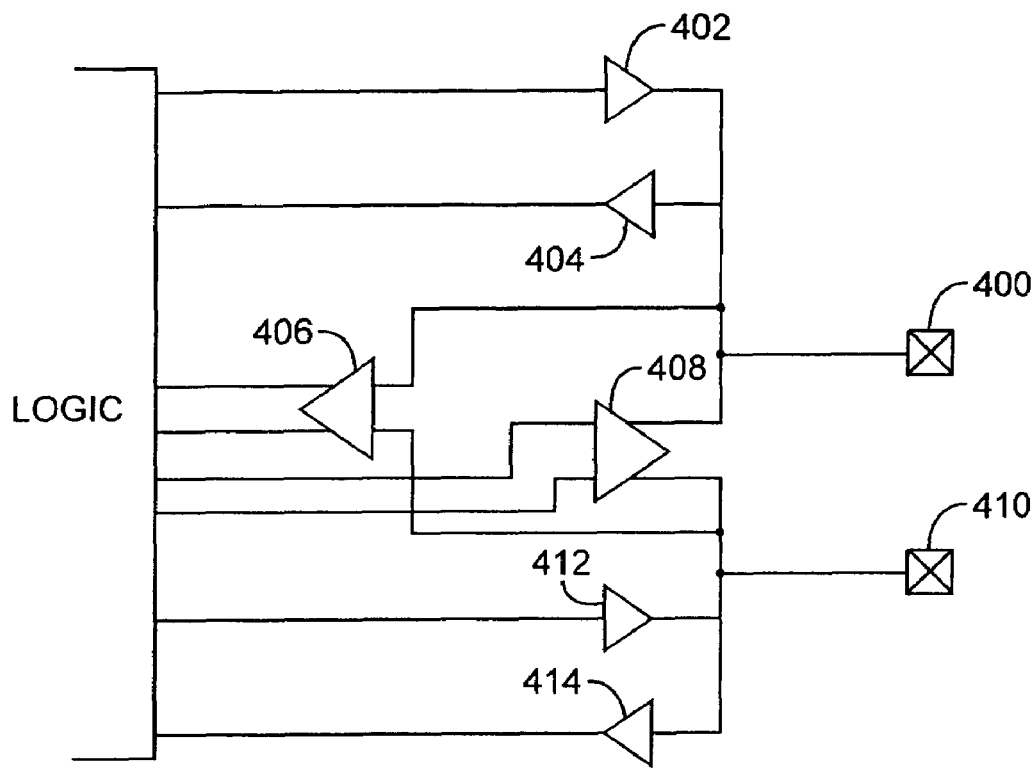
FIG. 4 illustrates a specific example of a programmable output circuit that can be programmed to either drive data onto an external terminal, provide termination, or adjust DC level of the signal on the external terminal.

The present invention is not limited to devices with I/O circuits that include one or more output buffers and an input differential buffer. The use of existing I/O circuitry to implement on-chip programmable termination or DC level adjustment can be applied to circuits where the same external terminal can be a single-ended input terminal, a single-ended output terminal, one of a pair of differential input terminals, or one of a pair of differential output terminals. The above referenced Stratix family of PLDs manufactured by Altera is one example of a device that provides dedicated programmable single-ended and differential I/O buffers for each I/O terminal. Referring to FIG. 4, there is shown a simplified block diagram of such an I/O circuitry. Programmably connected to an I/O terminal 400, there are a dedicated single-ended output buffer 402, a dedicated single-ended input buffer 404, one half of a differential input buffer 406 and one half of a differential output buffer 408. Similarly, I/O terminal 410 connects to a dedicated input buffer 414 and a dedicated output buffer 412 in addition to the other half of differential input buffer 406 and differential output buffer 408. By programmably controlling the configuration of the I/O circuit external terminals 400 and 410 can carry any one of a single-ended or differential input or output data. Accordingly, the teachings of the present invention as described above can be applied to the I/O circuit of FIG. 4 to programmably implement on-chip far-end or near-end termination impedance or DC level shifting using the existing I/O resources.

In another embodiment the invention provides differential termination impedance between two external terminal, an exemplary embodiment of which is shown in FIG. 5. In this embodiment, a differential buffer 500 connects to differential terminals 502 and 504. A differential termination structure 506 connects between terminals 502 and 504 and provides for programmably adjustable differential termination. Differential buffer 500 may be either an input buffer or an output buffer. That is, termination structure 506 may provide either far-end termination or near-end termination. Differential termination 506 according to this embodiment of the present invention includes multiple parallel-connected branches of programmable resistance. Each branch includes a pair of serially-connected transistors that are connected between nodes 502 and 504. Series resistors shown in phantom can be optionally provided in each branch. The series resistors are passive resistors made of, for example, polysilicon material. The transistors are preferably identical in size and formation as are the resistors. Each of the transistors has its gate terminal connected to a programmable node P. Any one of a number different types of programmable elements such as a static random access memory (SRAM) cell or electrically erasable read only memory (EEPROM) cell and the like can be used to drive the gates of the transistors. Gate terminals of the transistors can be driven by control circuitry to further enhance the operation of the termination as described in greater detail in the above-referenced commonly-assigned patent application number 10/056,759, titled "Self-Tracking Circuit Technique for Integration of Differential Termination Resistance," by Yang. A resistive branch can be added or removed by turning its transistors on or off to arrive at a desired resistance value. Because the on resistance of the transistors vary with process and temperature changes, the optional series resistors help tighten the overall resistance value of each branch.

Each programmable resistive branch in termination structure 506 includes two transistors in order to maintain symmetry between the two terminals 502 and 504. For example, external pins 502 and 504 are physically separated by an appreciable distance in microelectronic terms. Therefore to ensure a balanced provision of impedance between the two pins, two transistors that are symmetrically disposed are provided in each branch. In one embodiment, for each resistive branch made up of NMOS transistors the circuit includes a corresponding parallel branch with PMOS transistors. The addition of the PMOS branches extends the operational voltage range of the circuit. Depending on the fabrication process, one or the other of the NMOS or PMOS transistors may be more sensitive to environmental variations. In an alternative embodiment, the series resistors can be increased for that resistive branch with the more sensitive transistor type. FIG. 6 shows one example wherein one resistive branch 600 with PMOS transistors connects between internal nodes 602 and 604 of its corresponding NMOS branch 600. In this manner PMOS branch 600 has a larger value of series passive resistance (R1+R1' and R2+R2') as compared to NMOS branch 600 (R1 and R2). This further reduces the sensitivity of the overall impedance for the PMOS branch to environmental variations without requiring additional passive resistors. Variations on the makeup of such network will be known to integrated circuit designers.

For those resistive branches that are not enabled, i.e., have their transistors turned off, under certain conditions there may be a chance that a signal one terminal (e.g., 502) may disturb the signal on the adjacent terminal (504). When, for example, transistors T1 and T2 in termination structure 506 of FIG. 5 are turned off, their common node 508 will be left floating. This may allow an undershooting signal at terminal 502 to disturb the signal at terminal 504. A similar problem with an overshooting signal may occur for the resistive branches with turned off PMOS transistors. To protect against such feed-through, a specific embodiment of the present invention biases the common nodes between the pair of series transistors in each resistive branch to avoid a floating condition when the transistors are turned off. Referring to FIG. 7, two resistive branches 700 and 702 are shown in an embodiment where no passive resistors are employed. As shown in FIG. 7, the common nodes 704 and 706 in each branch connects to a programmably driven transistor for biasing purposes. Accordingly, when the NMOS resistive transistors are turned off in branch 700, a PMOS bias transistor T3 is turned on by the programmable element P at its gate terminal. This causes node 704 to be pulled up to Vcc preventing against an undershoot from one terminal feeding thought the branch to the other. Similarly, an NMOS bias transistor T4 connects common node 706 in PMOS resistive branch 702 to ground when turned on by programmable element P connected to its gate. When the PMOS transistors in branch 702 are turned off, transistor T4 is turned on to pull node 706 down to ground. This prevents against overshoot at one terminal to feed through branch 702 to the other terminal.

Figure 8:
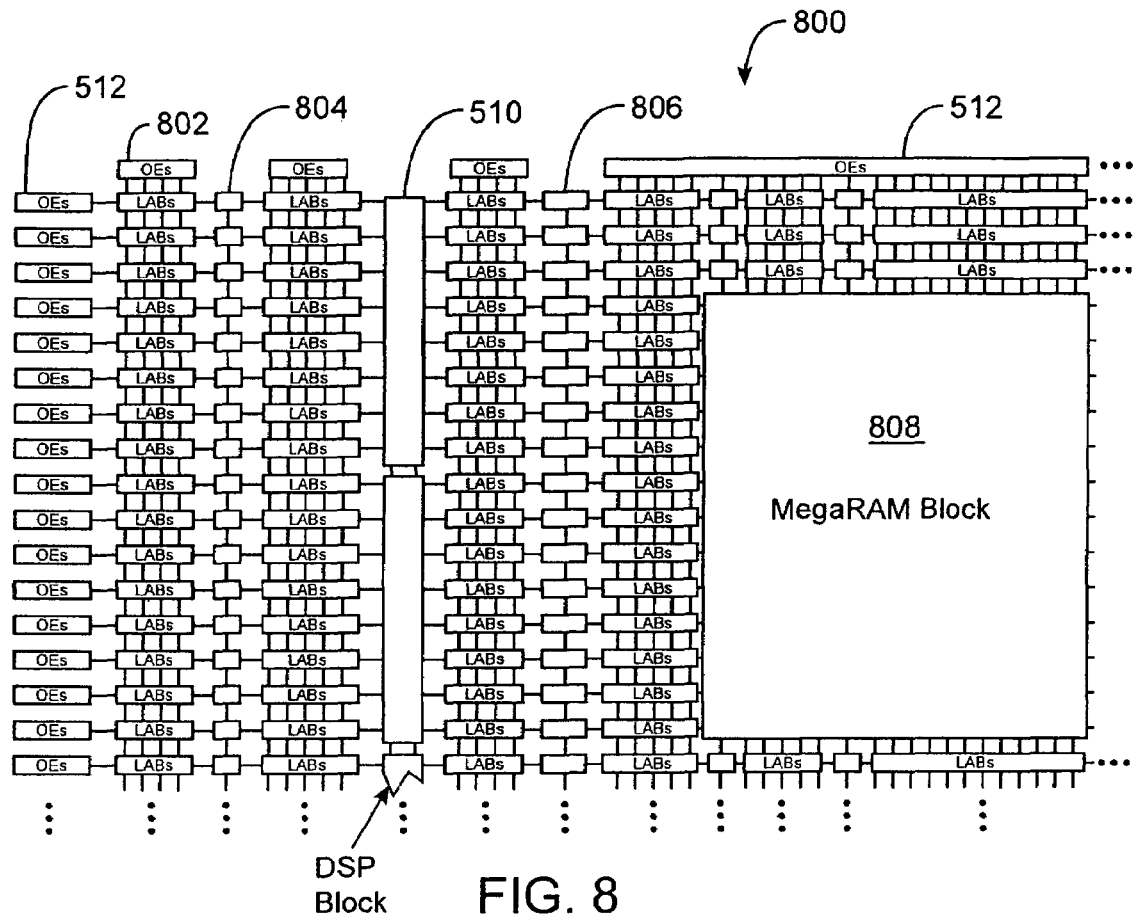
FIG. 8 is a simplified block diagram of a programmable logic device implementing the on-chip programmable termination according to an embodiment of the present invention.

While the various programmable on-chip termination techniques described above apply generally to many different types of integrated circuits, they are particularly suitable for PLDs. Today's high-density PLDs are not only used to implement custom logic with the characteristic quick turnaround, they provide resources that allow them to implement system solutions for the networking, wireless and general high-bandwidth telecommunication applications. Such applications typically require high speed I/O interface solutions with support for a variety of single-ended and differential I/O standards. FIG. 8 is a simplified partial block diagram of an exemplary high-density PLD 800 wherein the on-chip termination techniques according to the present invention can be utilized. PLD 800 includes a two-dimensional array of programmable logic array blocks (or LABs) 802 that are interconnected by a network of column and row interconnects of varying length and speed. LABs 802 include multiple (e.g., 10) logic elements (or LEs), an LE being a small unit of logic that provides for efficient implementation of user defined logic functions. PLD 800 also includes a distributed memory structure including RAM blocks of varying sizes provided throughout the array. The RAM blocks include, for example, 512 bit blocks 804, 4K blocks 806 and a MegaBlock 508 providing 512K bits of RAM. These memory blocks may also include shift registers and FIFO buffers. PLD 800 further includes digital signal processing (DSP) blocks 510 that can implement, for example, multipliers with add or subtract features. I/O elements (IOEs) 512 located, in this example, around the periphery of the device support numerous single-ended and differential I/O standards and provide for programmable on-chip termination according to the various embodiments described above. Further details of PLD 800 can be found in the above-referenced Altera data sheet describing the Stratix family of PLDs. It is to be understood that PLD 800 is described herein for illustrative purposes only and that the present invention can be implemented in many different types of PLDs, FPGAs, and the like.

Figure 9:
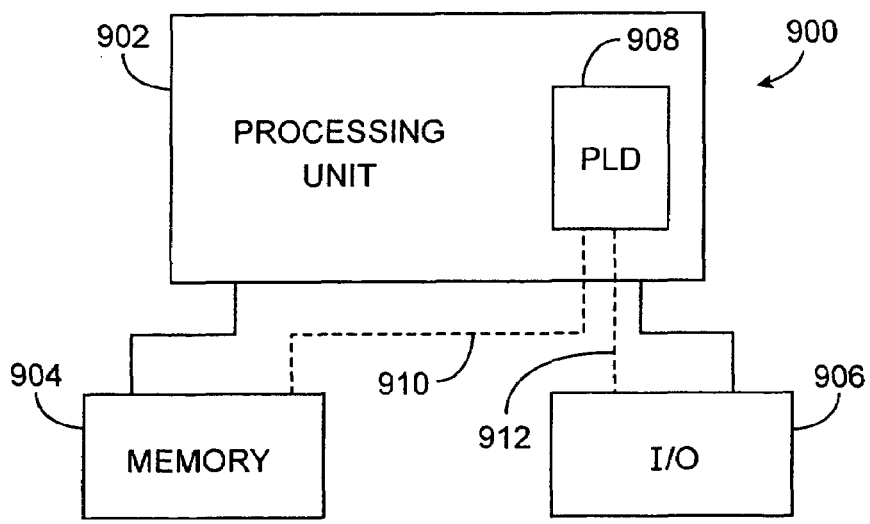
FIG. 9 is a block diagram of an electronic system implemented using the on-chip programmable termination according to an embodiment of the present invention.

While PLDs of the type shown in FIG. 8 provide many of the resources required to implement system level solutions, the present invention can also benefit systems wherein a PLD with the I/O structure according to the various embodiments of the invention is one of several components. FIG. 9 shows a block diagram of an exemplary digital system 900, within which the present invention may be embodied. System 900 may be a programmed digital computer system, digital signal processing system, specialized digital switching network, or other processing system. Moreover, such systems may be designed for a wide variety of applications such as telecommunications systems, automotive systems, control systems, consumer electronics, personal computers, Internet communications and networking, and others. Further, system 900 may be provided on a single board, on multiple boards, or within multiple enclosures.

System 900 includes a processing unit 902, a memory unit 904 and an I/O unit 906 interconnected together by one or more buses. According to this exemplary embodiment, a programmable logic device 908 is embedded in processing unit 902. PLD 908 may serve many different purposes within the system in FIG. 9. PLD 908 may, for example, be a logical building block of processing unit 902, supporting its internal and external operations. PLD 908 is programmed to implement the logical functions necessary to carry on its particular role in system operation. PLD 908 may be specially coupled to memory 904 through connection 910 and to I/O unit 906 through connection 912. Processing unit 902 may direct data to an appropriate system component for processing or storage, execute a program stored in memory 904 or receive and transmit data via I/O unit 906, or other similar function. Processing unit 902 may be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU. For example, instead of a CPU, one or more PLDs 908 may control the logical operations of the system. In an embodiment, PLD 908 acts as a reconfigurable processor, which can be reprogrammed as needed to handle a particular computing task. Alternately, programmable logic device 908 may itself include an embedded microprocessor. Memory unit 904 may be a random access memory (RAM), read only memory (ROM), fixed or flexible disk media, PC Card flash disk memory, tape, or any other storage means, or any combination of these storage means.

The present invention thus provides various techniques for implementing circuits and systems having highly flexible I/O circuitry with programmable on-chip termination and DC level adjustment. The techniques of the present invention allow an integrated circuit to meet a variety of different high speed single-ended and differential I/O standards. While the above provides a complete description of specific embodiments of the present invention, it is possible to use various alternatives, modifications and equivalents. Therefore, the scope of the present invention should not be limited to the specific and illustrative embodiments described above, and should instead be determined with reference to the appended claims along with their full scope of equivalents.

What is claimed is:

1. An integrated circuit comprising:

core logic to process data;

a single ended buffer coupled between the core logic and a first external terminal, wherein the single ended buffer comprises a first pull-up transistor and a first pull-down transistor both coupled to the first external terminal:

a differential input buffer having input terminals coupled to the first external terminal and a second external terminal; and a single ended output buffer having an output terminal coupled to the first external terminal, wherein the single ended output buffer comprises a second pull-up transistor and a second pull down transistor both coupled to the first external terminal, wherein the single ended buffer is an input buffer that has an input terminal coupled to the first external terminal, and wherein the differential input buffer comprises a first termination network having two transistors coupled in series between the first external terminal and the second external terminal.

2. An integrated circuit comprising:

core logic to process data;

a single ended buffer coupled between the ore logic and a first eternal terminal, wherein the single ended buffer comprises a first pull-up transistor and a first pull-down transistor both coupled to the first external terminal;

a differential input buffer having input terminals coupled to the first external terminal and a second external terminal; and a differential output buffer having output terminals coupled to the first and second external terminals, the differential output buffer comprises a second termination network having two transistors coupled in series between the first external terminal and the second external terminal, wherein the differential input buffer comprises a first termination network having two transistors coupled in series between the first external terminal and the second external terminal.

3. An integrated circuit comprising:
core logic to process data;
a single ended buffer coupled between the core logic and a first external terminal, wherein the single ended buffer comprises a first pull-up transistor and a first pull-down transistor both coupled to the first external terminal; and
a differential input buffer having input terminals coupled to the first external terminal and a second external terminal,
wherein the differential input buffer comprises a first termination network having two transistors coupled in series between the first external terminal and the second external terminal, and
wherein the differential input buffer fiber comprises second and third termination networks that each have two transistors coupled in series between the first external terminal and the second external terminal.

4. The integrated circuit defined in claim 3 wherein the differential input buffer further comprises a fourth termination network having two transistors coupled in series between the first external terminal and the second external terminal.

5. An integrated circuit comprising:
core logic to process data;
a single ended buffer coupled between the core logic and a first external terminal, wherein the single ended buffer comprises a first pull-up transistor and a first pull-down transistor both coupled to the first external terminal;
a differential output buffer having input terminals coupled to the first external terminal and a second external terminal;
wherein the differential output buffer comprises a first termination network having two transistors coupled in series between the first external terminal and the second external terminal;
wherein the differential buffer further comprises a bias transistor coupled to a common node between the two transistors of the first termination network; and
wherein the core logic comprises programmable logic blocks.

6. The integrated circuit defined in claim 5 wherein the single ended buffer is an input buffer that has an input terminal coupled to the first external terminal.

7. The integrated circuit defined in claim 6 further comprising:
a single ended output buffer having an output terminal coupled to the first external terminal, wherein the single ended output buffer comprises a second pull-up transistor and a second pull down transistor both coupled to the first external terminal.

8. The integrated chit defined in claim 7 further comprising:
a differential input buffer having output terminals coupled to the first and second external terminals, and the differential input buffer comprises a second termination network having two transistors coupled in series between the first external terminal and the second external terminal.

9. An integrated circuit comprising:
core logic configurable to process data;
a single ended buffer coupled between the core logic and a first pin, wherein the single ended buffer comprises a first pull-up transistor and a first pull-down transistor that are coupled to the first pin;
a differential input buffer having input terminals coupled to the first pin and a second pin;
first and second termination transistors coupled in series between the first and the second pins;
a bias transistor coupled to a common node between the first and second termination transistors; and
wherein the core logic comprises an array of logic blocks.

10. The integrated circuit defined in claim 9 wherein the single ended buffer is an input buffer that has an input terminal coupled to the first pin.

11. The integrated circuit defined in claim 9 further comprising:
a differential output buffer having output terminals coupled to the first and the second pins.

12. The integrated circuit defined in claim 9 further comprising:
third and fourth termination transistors coupled in series between the first and the second pins.

13. The integrated circuit defined in claim 12 further comprising:
fifth and sixth termination transistors coupled in series between the first and the second pins.

14. The integrated circuit defined in claim 13 further comprising:
seventh and eighth termination transistors coupled in series between the first and the second pins.

15. An integrated circuit comprising:
core logic configurable to process data;
a single ended buffer coupled between the core logic and a first pin, wherein the single ended buffer comprises a first pull-up transistor and a first pull-down transistor that are coupled to the first pin;
a differential output buffer having output terminals coupled to the first pin and a second pin;
first and second differential termination transistors coupled in series between the first and the second pins;
a bias transistor coupled to a common node between the first and second differential termination transistors, and
wherein the core logic comprises an array of logic blocks.

16. The integrated circuit defined in claim 15 wherein the single ended buffer is an input buffer that has an input terminal coupled to the first pin.

17. The integrated circuit defined in claim 15 wherein the single ended buffer is an output buffer that has an output terminal coupled to the first pin.

18. The integrated circuit defined in claim 15 further comprising:
a differential input buffer having input terminals coupled to the first and the second pins; and
third and fourth differential termination transistors coupled in series between the first and the second pins.

19. The integrated circuit defined in claim 15 further comprising:
third and fourth differential termination transistors coupled in series between the first and the second pins; and
fifth and sixth differential termination transistors coupled in series between the first and the second pins.

20. The integrated circuit defined in claim 19, further comprising:
seventh and eighth differential termination transistors coupled in series between the first and the second pins.

21. An integrated circuit comprising:
a differential input buffer having a first input coupled to a first pad and a second input coupled to a second pad;
a first single-ended output buffer having an output coupled to the first pad;
a second single-ended output buffer having an output coupled to the second pad; and a termination network coupled between the first and second pads and comprising:
  a first transistor coupled between the first pad and a first node;
  a second transistor coupled between the first node and the second pad;
  a third transistor coupled between the first pad and a second node; and
  a fourth transistor coupled between the second node and the second pad.

22. The integrated circuit of claim 21 further comprising:
control circuitry coupled to a gate of the first transistor, a gate of the second transistor, a gate of the third transistor, and a gate of the fourth transistor,
wherein the control circuitry selectively turns on or turns off the first, second, third, and fourth transistors.

23. The integrated circuit of claim 21 further comprising:
control circuitry coupled to a gate of the first transistor, a gate of the second transistor, a gate of the third transistor, and a gate of the fourth transistor,
wherein the control circuitry selectively turns on or turns off the first, second, third, and fourth transistors to adjust an impedance of the termination network.

24. The integrated circuit of claim 23 further comprising:
a fifth transistor coupled to the first node to bias the first node at a first supply voltage when the first and second transistors are off; and
a sixth transistor coupled to the second node to bias the second node at a second supply voltage when the third and fourth transistors are turned off.

25. The integrated circuit of claim 21 wherein the first and second transistors are n-channel transistors.

26. The integrated circuit of claim 21 wherein the first and second transistors are n-channel transistors and the third and fourth transistors are p-channel transistors.

27. The integrated circuit of claim 21 further comprising:
a plurality of programmable logic elements configurable to implement user-defined logic functions; and
a plurality of programmable interconnect lines configurable to couple the differential input buffer, the first single-ended output buffer, and the second single-ended output buffer to the plurality of programmable logic elements.

28. The integrated circuit of claim 21 further comprising:
a first single-ended input buffer coupled to the first pad; and
a second single-ended input buffer coupled to the second pad.

29. An integrated circuit comprising;
a differential input buffer coupled to a first and a second pad;
a first single-ended input buffer coupled to the first pad;
a second single-ended input buffer coupled to the second pad;
a first single-ended output buffer coupled to the first pad;
a second single-ended output buffer coupled to the second pad;
a first termination network connected directly to the first and second pads and comprising:
  a first transistor connected directly to the first pad and a first node; and
  a second transistor connected directly to the second pad and the first node;
and
a second termination network connected directly to the first and second pads and comprising:
  a third transistor connected directly to the first pad and a second node; and
  a fourth transistor connected directly to the second pad and the second node.

30. The integrated circuit of claim 29 further comprising:
control circuitry coupled to a gate of the first transistor, a gate of the second transistor, a gate of the third transistor, and a gate of the fourth transistor,
wherein the control circuitry selectively turns on or turns off the first, second, third, and fourth transistors.

31. The integrated circuit of claim 29 further comprising:
control circuitry coupled to a gate of the first transistor, a gate of the second transistor, a gate of the third transistor, and a gate of the fourth transistor,
wherein the control circuitry selectively turns on or turns off the first, second, third, and fourth transistors to adjust an impedance of the termination network.

32. The integrated circuit of claim 31 further comprising:
a fifth transistor connected directly to the first node to bias the first node at a first supply voltage when the first and second transistors are off; and
a sixth transistor connected directly to the second node to bias the second node at a second supply voltage when the third and fourth transistors are turned off.

33. The integrated circuit of claim 29 wherein the first and second transistors are n-channel transistors.

34. The integrated circuit of claim 29 wherein the first and second transistors are n-channel transistors and the third and fourth transistors are p-channel transistors.

35. The integrated circuit of claim 29 further comprising:
a plurality of programmable logic elements configurable to implement user-defined logic functions; and
a plurality of programmable interconnect lines configurable to couple the differential input buffer, the first single-ended output buffer, and the second single-ended output buffer to the plurality of programmable logic elements.

36. An integrated circuit comprising:
a plurality of programmable logic elements configurable to implement user-defined logic functions;
a differential input buffer coupled to a first and a second pad;
a first single-ended output buffer coupled to the first pad;
a second single-ended output buffer coupled to the second pad;
a first termination network coupled to the first and second pads and comprising:
  a first transistor coupled to the first pad and a first node;
  a second transistor coupled to the second pad and the first node; and
  a third transistor coupled to the first node; and
a second termination network coupled to the first and second pads and comprising:
  a fourth transistor coupled to the first pad and a second node;
  a fifth transistor coupled to the second pad and the second node; and
  a sixth transistor coupled to the second node.

37. The integrated circuit of claim 36 further comprising:
control circuitry coupled to a gate of the first transistor, a gate of the second transistor, and a gate of the third transistor,
wherein when the control circuitry turns on the first and second transistors, the control circuitry turns off the third transistor, and when the control circuitry turns off the first and second transistors, the control circuitry turns on the third transistor.

38. The integrated circuit of claim 36 further comprising:
control circuitry coupled to a gate of the first transistor, a gate of the second transistor, a gate of the fourth transistor, and a gate of the fifth transistor,
wherein the control circuitry selectively turns on or turns off the first, second, fourth, and fifth transistors to adjust an impedance of the termination network.

39. The integrated circuit of claim 36 wherein the first and second transistors are n-channel transistors.

40. The integrated circuit of claim 36 wherein the first and second transistors are n-channel transistors and the fourth and fifth transistors are p-channel transistors.

41. The integrated circuit of claim 36 further comprising:
a plurality of programmable logic elements configurable to implement user-defined logic functions; and
a plurality of programmable interconnect lines configurable to couple the differential input buffer, the first single-ended output buffer, and the second single-ended output buffer to the plurality of programmable logic elements.

42. The integrated circuit of claim 36 further comprising:
a first single-ended input buffer coupled to the first pad; and
a second single-ended input buffer coupled to the second pad.

43. An integrated circuit comprising:
a first single-ended output buffer having an output coupled to a first pad;
a second single-ended output buffer having an output coupled to a second pad;
a termination network connected directly to the first and second pads and comprising:
a first transistor connected directly to the first pad and a first node;
a second transistor connected directly to the first node and the second pad;
a third transistor connected directly to the first pad and a second node; and
a fourth transistor connected directly to the second node and the second pad; and
a control circuit coupled to a gate of the first transistor and a gate of the second transistor.

44. The integrated circuit of claim 43 wherein the control circuit turns on or turns off the first and second transistors.

45. The integrated circuit of claim 43 wherein the control circuitry is further coupled to a gate of the third and fourth transistors,
wherein the control circuitry selectively turns on or turns off the first, second, third, and fourth transistors to adjust an impedance of the termination network.

46. The integrated circuit of claim 45 further comprising:
a fifth transistor connected directly to the first node to bias the first node at a first supply voltage when the first and second transistors are off; and
a sixth transistor connected directly to the second node to bias the second node at a second supply voltage when the third and fourth transistors are turned off.

47. The integrated circuit of claim 43 wherein the first and second transistors are n-channel transistors.

48. The integrated circuit of claim 43 wherein the first and second transistors are n-channel transistors and the third and fourth transistors are p-channel transistors.

49. The integrated circuit of claim 43 further comprising:
a plurality of programmable logic elements configurable to implement user-defined logic functions; and
a plurality of programmable interconnect lines configurable to couple the first single-ended output buffer and the second single-ended output buffer to the plurality of programmable logic elements.

50. The integrated circuit of claim 43 further comprising:
a differential input buffer having a first input coupled to the first pad and a second input coupled to the second pad;
a first single-ended input buffer coupled to the first pad; and
a second single-ended input buffer coupled to the second pad.

51. An integrated circuit comprising:
a differential input buffer having a first input coupled to the first pad and a second input coupled to the second pad;
a first single-ended input buffer coupled to the first pad;
a second single-ended input buffer coupled to the second pad,
a first single-ended output buffer having an output coupled to the first pad;
a second single-ended output buffer having an output coupled to the second pad;
a first termination network coupled between the first and second pads and comprising:
a first transistor coupled between the first pad and a first node; and
a second transistor coupled between the first node and the second pad,
wherein the first and second transistors are n-channel transistors,
a second termination network coupled between the first and second pads and comprising:
a third transistor coupled between the first pad and a second node; and
a fourth transistor coupled between the second node and the second pad,
wherein the third and fourth transistors are p-channel transistors, and
control circuitry coupled to a gate of the first transistor, a gate of the second transistor, a gate of the third transistor, and a gate of the fourth transistor, wherein the control circuit turns on or turns off the first, second, third, and fourth transistors.

52. The integrated circuit of claim 51 wherein the control circuitry turns on or turns off the first, second, third, and fourth transistors to adjust an impedance of the termination network.

53. The integrated circuit of claim 52 further comprising:
a fifth transistor-connected directly to the first node to bias the first node at a first supply voltage when the first and second transistors are off; and
a sixth transistor connected directly to the second node to bias the second node at a second supply voltage when the third and fourth transistors are turned off.

* * * * *